US008877513B2

(12) United States Patent
Mathus et al.

(10) Patent No.: US 8,877,513 B2
(45) Date of Patent: Nov. 4, 2014

(54) METHOD OF USING A DISPOSABLE PIPETTE TIP

(71) Applicant: Integra Biosciences Corp., Hudson, NH (US)

(72) Inventors: Gregory Mathus, Concord, MA (US); Terrance Kelly, Lowell, MA (US); Richard Cote, Bolton, MA (US)

(73) Assignee: Integra Biosciences AG, Zizers (CH)

(*) Notice: Subject to any disclaimer, the term of this patent is extended or adjusted under 35 U.S.C. 154(b) by 0 days.

(21) Appl. No.: 13/952,731

(22) Filed: Jul. 29, 2013

(65) Prior Publication Data

US 2013/0306155 A1 Nov. 21, 2013

Related U.S. Application Data

(63) Continuation of application No. 12/578,714, filed on Oct. 14, 2009, now Pat. No. 8,501,118, which is a continuation of application No. 11/934,381, filed on Nov. 2, 2007, now Pat. No. 7,662,344, which is a continuation-in-part of application No. 11/552,384, filed on Oct. 24, 2006, now Pat. No. 7,662,343.

(51) Int. Cl.
*G01N 1/10* (2006.01)
*B01L 3/02* (2006.01)

(52) U.S. Cl.
CPC ......... *B01L 3/0275* (2013.01); *B01L 2200/087* (2013.01); *B01L 2200/0689* (2013.01); *B01L 2200/025* (2013.01); *B01L 3/0279* (2013.01); *B01L 2300/027* (2013.01); *B01L 2200/023* (2013.01)
USPC ........... 436/180; 422/524; 422/525; 422/501; 422/509; 422/511; 422/521; 422/922; 422/931; 73/863.32; 73/864; 73/864.01; 73/864.11

(58) Field of Classification Search
CPC ................ B01L 3/0275; B01L 3/0279; B01L 2200/689; G01N 35/10; G01N 2001/1056
USPC ......... 422/524–525, 501, 509, 511, 521, 922, 422/931; 436/180; 73/863.32, 864, 864.01, 73/864.11; 137/1
See application file for complete search history.

(56) References Cited

U.S. PATENT DOCUMENTS 4,072,330 A 2/1978 Brysch
4,721,680 A 1/1988 Jeffs et al.
(Continued)

FOREIGN PATENT DOCUMENTS

DE 102 29 788 1/2004
DE 102006036764 2/2008
(Continued)

OTHER PUBLICATIONS

Pipetman Concept, Gilson, Aug. 2005.

*Primary Examiner* — Brian R Gordon
(74) *Attorney, Agent, or Firm* — Andrus Intellectual Property Law, LLP

(57) ABSTRACT

The pipetting method is directed to mounting and ejecting a disposable pipette tip. The pipetting system has one or more tip mounting shafts with an upper locking section and a lower sealing section. The upper locking section has outwardly extending lobes spaced around the mounting shaft and located above a stop member. The lower sealing section on the tip mounting shaft is located below the stop. As the mounting shaft is inserted into the collar of the disposable pipette, the collar distorts out of round and engages the lobes on the upper locking section of the tip mounting shaft. Contemporaneously, the lower sealing section of the mounting shaft seals against the barrel of the disposable pipette tip.

9 Claims, 7 Drawing Sheets

(56) References Cited

U.S. PATENT DOCUMENTS

| | | | |
|---|---|---|---|
| 4,748,859 A | 6/1988 | Magnussen, Jr. et al. | |
| 4,824,641 A | 4/1989 | Williams | |
| 4,917,274 A | 4/1990 | Asa et al. | |
| 4,961,350 A | 10/1990 | Tennstedt | |
| 4,999,164 A | 3/1991 | Puchinger et al. | |
| 5,032,343 A | 7/1991 | Jeffs et al. | |
| 5,200,151 A | 4/1993 | Long | |
| 5,232,669 A | 8/1993 | Pardinas | |
| 5,306,510 A | 4/1994 | Meltzer | |
| 5,525,302 A | 6/1996 | Astle | |
| 5,580,529 A | 12/1996 | DeVaughn et al. | |
| 5,736,105 A | 4/1998 | Astle | |
| 5,948,359 A | 9/1999 | Kalra et al. | |
| 6,168,761 B1 | 1/2001 | Kelly et al. | |
| 6,171,553 B1 | 1/2001 | Petrek | |
| 6,197,259 B1 | 3/2001 | Kelly et al. | |
| 6,248,295 B1 | 6/2001 | Petrek | |
| 6,495,106 B1 | 12/2002 | Kalia et al. | |
| 6,499,363 B1 | 12/2002 | Morimoto et al. | |
| 6,582,664 B2 | 6/2003 | Bevirt et al. | |
| 6,589,483 B1 * | 7/2003 | Maeda | 422/525 |
| 6,596,240 B2 | 7/2003 | Taggart et al. | |
| 6,627,160 B2 | 9/2003 | Wanner | |
| 6,737,023 B1 | 5/2004 | Kelly et al. | |
| 6,745,636 B2 | 6/2004 | Rainin et al. | |
| 6,780,381 B2 | 8/2004 | Yiu | |
| 6,967,004 B2 | 11/2005 | Rainin et al. | |
| 6,973,845 B2 | 12/2005 | Bell | |
| 6,977,062 B2 | 12/2005 | Cronenberg | |
| 7,033,543 B1 | 4/2006 | Panzer et al. | |
| 7,335,337 B1 | 2/2008 | Smith | |
| 7,641,859 B2 | 1/2010 | Cote et al. | |
| 8,071,050 B2 | 12/2011 | Smith | |
| 8,202,495 B1 | 6/2012 | Smith | |
| 8,277,757 B2 | 10/2012 | Kelly et al. | |
| 8,343,438 B1 * | 1/2013 | Smith | 422/501 |
| 8,512,650 B2 * | 8/2013 | Jungheim et al. | 422/524 |
| 8,557,200 B1 * | 10/2013 | Smith | 422/524 |
| 2001/0043885 A1 | 11/2001 | Wanner | |
| 2002/0094302 A1 | 7/2002 | Taggert et al. | |
| 2002/0146353 A1 | 10/2002 | Bevirt et al. | |
| 2003/0082078 A1 | 5/2003 | Rainin et al. | |
| 2003/0165408 A1 | 9/2003 | Takeda et al. | |
| 2003/0219359 A1 | 11/2003 | Lenz et al. | |
| 2004/0071602 A1 | 4/2004 | Yiu | |
| 2005/0069460 A1 | 3/2005 | Lohn | |
| 2005/0175511 A1 | 8/2005 | Cote et al. | |
| 2005/0255005 A1 | 11/2005 | Motadel | |
| 2005/0265900 A1 | 12/2005 | Gard et al. | |
| 2006/0171851 A1 | 8/2006 | Motadel | |
| 2006/0177352 A1 | 8/2006 | Ziegmann et al. | |
| 2006/0233669 A1 | 10/2006 | Panzer et al. | |
| 2009/0280033 A1 | 11/2009 | Cote et al. | |
| 2012/0291872 A1 * | 11/2012 | Brady et al. | 137/3 |
| 2013/0136672 A1 * | 5/2013 | Blumentritt et al. | 422/524 |

FOREIGN PATENT DOCUMENTS

| | | |
|---|---|---|
| EP | 0 148 333 | 7/1985 |
| EP | 0 494 735 | 7/1992 |
| EP | 0 701 865 | 3/1996 |
| EP | 1 319 437 | 6/2003 |
| EP | 1 862 219 | 12/2007 |
| WO | 00/27530 | 5/2000 |
| WO | 2006/123319 | 11/2006 |

* cited by examiner

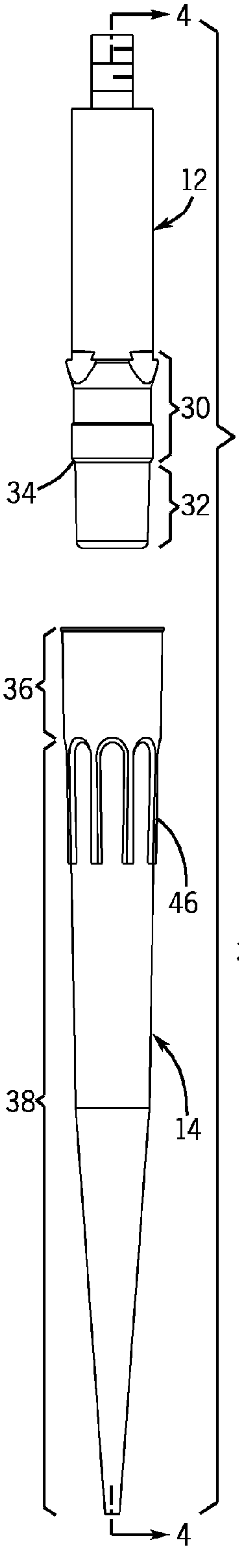
FIG. 3
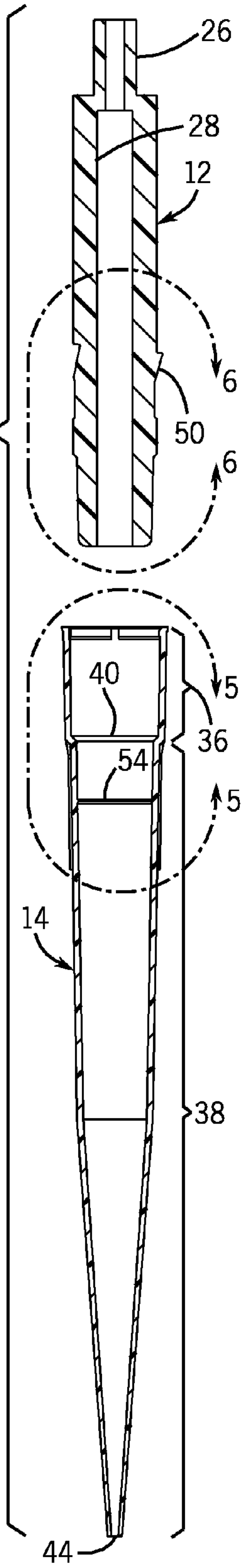
FIG. 4
FIG. 5
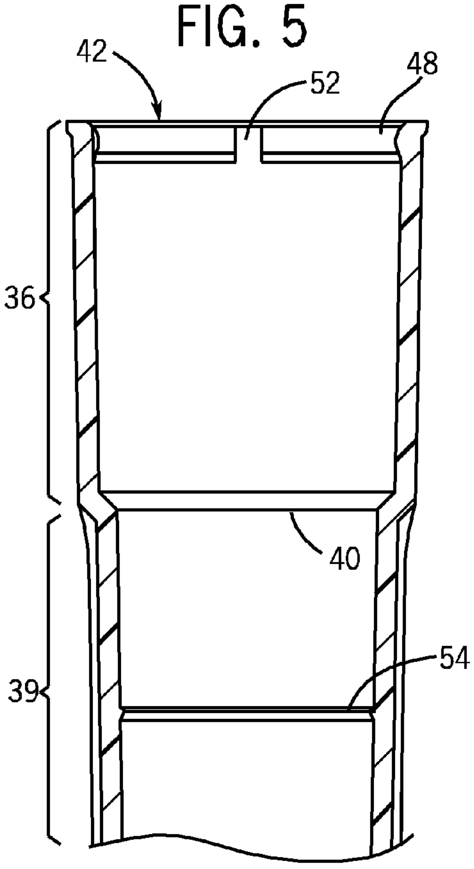

FIG. 9
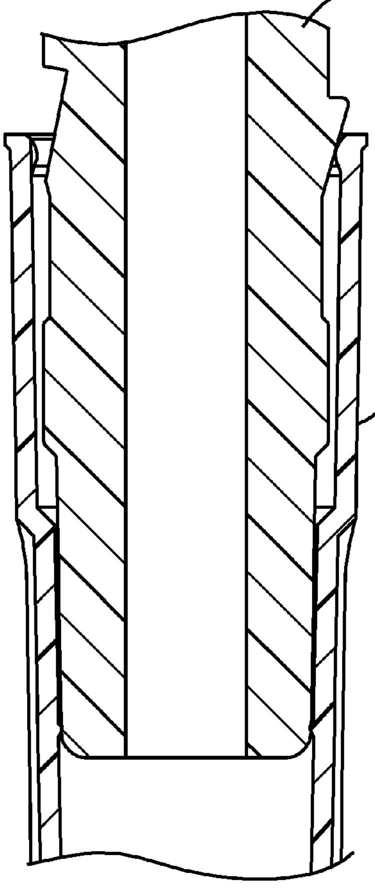
FIG. 10
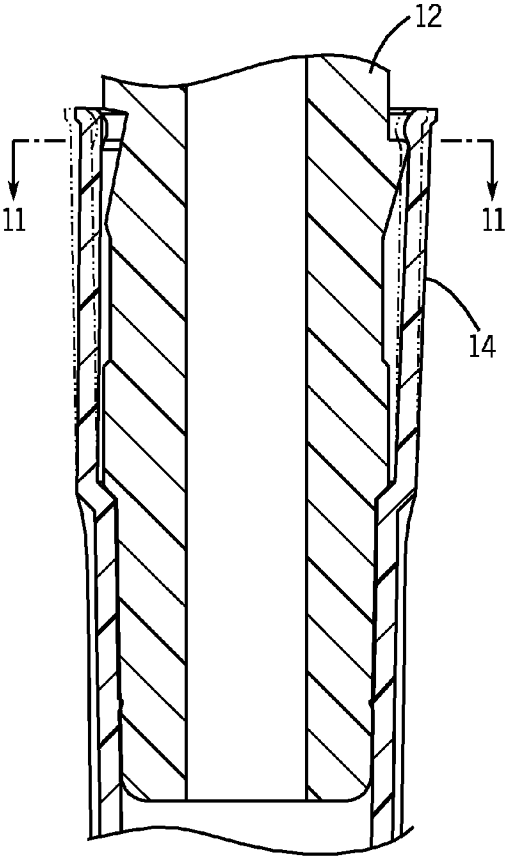
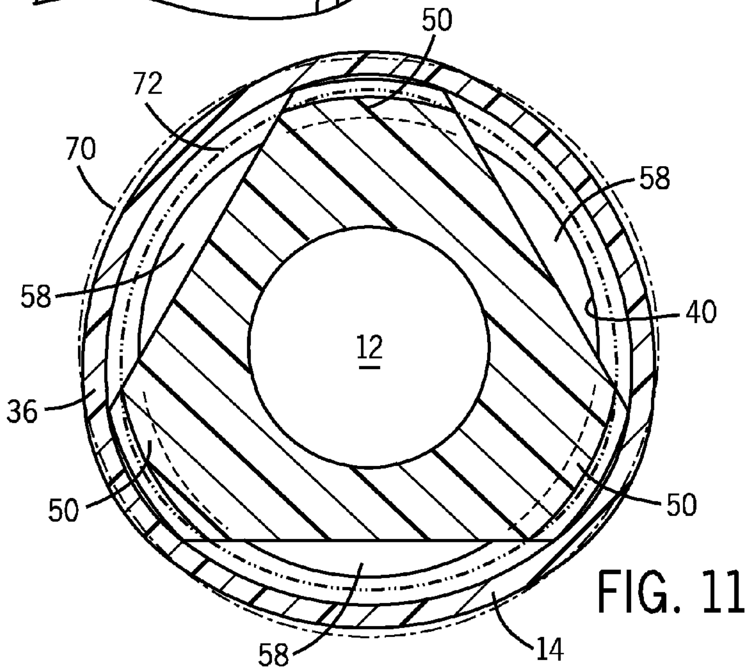
FIG. 11

METHOD OF USING A DISPOSABLE PIPETTE TIP

CROSS REFERENCE TO RELATED APPLICATION

This application is a continuation of U.S. patent application Ser. No. 12/578,714, filed Oct. 14, 2009, now U.S. Pat. No. 8,501,118, issued Aug. 6, 2013 entitled "Disposable Pipette Tip," by Gregory Mathus, Terrence Kelly and Richard Cote; which is a continuation of U.S. patent application Ser. No. 11/934,381, filed Nov. 2, 2007, now U.S. Pat. No. 7,662,344, issued Feb. 16, 2010 entitled "Locking Pipette Tip and Mounting Shaft", by Gregory Mathus, Terrence Kelly and Richard Cote, which is a Continuation-In-Part of U.S. patent application Ser. No. 11/552,384, which is entitled "Locking Pipette Tip And Mounting Shaft", by Gregory Mathus, Terrence Kelly and Richard Cote filed on Oct. 24, 2006, now U.S. Pat. No. 7,662,343, issued Feb. 16, 2010, which are both assigned to the assignee of the present application.

FIELD OF THE INVENTION

The invention relates to improvements in pipettes and automated liquid handling systems. More specifically, the invention relates to a configuration for pipette tip mounting shafts and disposable pipette tips that provides robust sealing engagement with low insertion and ejection forces as well as enhanced resistance to unintentional removal, and maintains the mounted tip in optimum position and orientation when the tip is mounted on the pipette tip mounting shaft.

BACKGROUND OF THE INVENTION

The use of disposable pipette tips with hand-held pipettes and automated liquid handling systems is well known. Disposable pipette tips enable repeated use of such pipetting systems to transfer different fluids or different fluid samples without carryover contamination. Disposable pipette tips are normally formed of a plastic material, such as polypropylene, and have a hollow, elongated, generally conical shape. The upper end of the pipette tip typically includes a collar that is mounted to the tip mounting shaft on the pipette device. The mounting shaft includes an internal bore through which air is displaced in order to aspirate liquid sample into and dispense liquid sample from the pipette tip. The far end of the pipette tip has a small opening through which liquid sample is received into and dispensed from the barrel of the pipette tip.

Disposable pipette tips have historically relied on tapered fits between the mounting shaft and the pipette tip collar, as well as sealing rings on the inside circumference of the pipette tip collar, to secure and seal the pipette tips to the mounting shaft. In most cases, the fit between the mounting shaft and the disposable tip is achieved by pushing the tapered mounting shaft into the tapered pipette tip collar until it wedges into the tip. At this point, a seal is achieved between the tip collar and the mounting shaft as a result of crushing the sealing ring and/or stretching the diameter of the collar. In addition to achieving a proper seal, it is also important that position and orientation of the mounted tip also be stable in the face of lateral momentum or slight knocking forces that are typical during normal use such as during touch-off on the sidewall of a vessel. In order to assure tip stability, users tend to jam the pipette mounting shaft into the tip with excessive force.

Various systems have been devised to provide proper sealing and stability without requiring excessive mounting and ejection forces. For example, the use of cylindrical mounting shafts and cylindrical tip collars lessens mounting and ejection forces. Also, it is well known to use a step within the pipette tip collar as a depth limiting means for the pipette mounting shaft. Even so, such systems typically require the force of an interference fit or stretching of the pipette tip collar to maintain stable engagement of the pipette tip and ensure a reliable seal of the collar against the mounting shaft.

A further approach is described in U.S. Patent Application Publication No. US 2005/0175511 A1 in which the pipette tip collar has inwardly projecting, cantilevered fingers that latch over a circumferential rim on the mounting Shaft. In this approach, sealing is achieved by an O-ring on the mounting shaft that is located below the location of the latching engagement. Ejection of the tip is achieved by modifying the ejection mechanism on the pipette so that it can release the inwardly projecting fingers on the pipette tip before asserting pressure to eject the tip from the mounting shaft.

SUMMARY OF THE INVENTION

In one aspect, the invention relates to a pipette tip mounting shaft configuration and a disposable pipette tip having a matching configuration. In its preferred form, the pipette tip mounting shaft includes a locking section located above a lower sealing section. The locking section includes a lower stop member and two or more outwardly extending locking lobes located above the stop member. The pipette tip collar locks onto the mounting shaft when mounting shaft is fully inserted into the collar of a mating pipette tip. The bore of the pipette tip includes a circumferential shelf or shoulder separating its upper collar from the sealing area of the tip located in the upper region of the tip barrel. The collar preferably includes a locking ring located at or near the upper opening of the collar. The dimensions of the collar, and in particular the distance between the circumferential shelf and the locking ring, are selected to match the dimensions on the mounting shaft between the stop member and the upper end of the locking lobes. The locking lobes preferably include a ramp portion that gently flexes and distorts the pipette tip collar out of round as the mounting shaft is inserted into the pipette tip collar. Due to relieved portions of the mounting shaft between the lobes, the tip collar flexes to distort out of round rather than stretch in order to accommodate the interference fit over the locking lobes. This configuration results in an ergonomic, over-center locking engagement. The feel of the engagement provides tactile feedback to the user of a hand-held pipette, in part, as a result of the flexing of the upper collar as the locking ring passes over the lobes on the mounting shaft into locking engagement. At the same time, the stop member on the mounting shaft limits penetration of the mounting shaft into the tip as the stop member engages the shelf in the tip, thus providing a clear indication that the tip is fully mounted The lower sealing area on the mounting shaft extends below the stop member. The lower sealing section is preferably tapered in a frustoconical shape, but can be cylindrical, depending on the geometry of the matching pipette tip. Similarly, the pipette tip preferably includes a sealing ring in a sealing area located below the circumferential shelf at the upper end of the pipette tip barrel. The shape of the tip sealing area should match the shape of the lower sealing section of the mounting shaft. The circumferential shelf on a pipette tip isolates the distortion of the collar from the sealing area when the tip is mounted on the mounting shaft, thus maintaining the roundness of the sealing area (i.e. a circular circumference for the inside surface of the pipette tip barrel) in which the sealing ring is located. This is important in order to facilitate reliable engagement of the sealing ring around the lower sealing section of the mounting shaft.

As the mounting shaft is pushed into the tip collar, the first point of contact is where the leading edge of the mounting shaft, i.e., the lower sealing section, enters through the circumferential shelf in the pipette tip and contacts the sealing ring. As the mounting shaft is further depressed into the pipette tip bore, sealing ring interference increases simultaneously as the ramp area of the lobes of the mounting shaft engages the locking ring on the tip collar to distort the upper portion of the collar our of round. As mentioned, while the overall insertion force is relatively light and ergonomic, the force increases noticeably and provides tactile feedback to the user that the tip is almost fully mounted. This increase in insertion force continues until the stop member on the mounting shaft engages the circumferential shelf on the pipette tip to abruptly stop further movement of the mounting shaft into the tip, at which point the lobes also snap engage under the locking ring in the collar bore. Thus alerting the user not to use additional, excessive force to mount the tip. These interrelated mounting conditions result in a secure stable mount with consistent sealing at the sealing ring. Alternatively, the initial engagement of the sealing ring can be staggered with respect to the engagement of the locking ring in order to lessen insertion force.

Moreover, the tip requires relatively low ejection force. When the pipette stripper sleeve pushes against the upper end of the tip collar, a relatively small ejection force is required to release the locking ring on the collar from the locking lobes on the mounting shaft. The flexing of the collar in its distorted shape when it is locked over the mounting shaft lobes stores energy. When the tip is released from the lobes, the combination of the pressure from the stripper and the release of the stored energy throw the tip from the mounting shaft, thereby facilitating convenient ejection of the tips from the mounting shaft after use.

In some circumstances, it may be desirable to further lessen tip insertion and injection forces, such as is particularly desirable with hand-held multi-channel pipettors. In order to achieve this objective, it may be desirable to lessen the amount of interference between the pipette tip and the mounting shaft prior to full insertion of the mounting shaft into the pipette tip. In one embodiment of the invention, this is achieved by reducing the diameter of the mounting shaft below the sealing area on the mounting shaft so that there is little or no interference with the circumferential sealing ring on the pipette tip, and by further providing the sealing area on the mounting shaft with a frustoconical shape to facilitate effective sealing engagement of the circumferential sealing ring on the pipette tip with the mounting shaft. This embodiment is particularly useful for small volume pipette tips, such as 12.5μ liter or 125μ liter pipette tips. The purpose of the frustoconical sealing zone is to accommodate a preselected vertical range of travel, such as 0.025 to 0.030 inches of vertical travel, for which the circumferential sealing ring on the pipette tip can effectively engage the frustoconical sealing area on the mounting shaft. The preferred amount of taper in the frustoconical sealing area on the mounting shaft is between 4° and 7° included angle, and is preferably calculated to accommodate for normal manufacturing tolerances for molded pipette tips. In other words, pipette tips in which the diameter of the circumferential sealing ring is relatively small within normal manufacturing tolerances will typically engage the lower edge of the frustoconical sealing area on the mounting shaft, whereas pipette tips with larger circumferential sealing rings within normal manufacturing, tolerances will engage slightly higher in the frustoconical sealing area on the mounting shaft.

In another embodiment that is particularly well suited to reduce insertion and ejection forces, the diameter of substantially all of the lower portion of the mounting shaft is reduced such that there is little or no interference between the circumferential sealing ring on the pipette tip and the mounting shaft, thereby rendering the circumferential sealing ring a stabilization ring rather than a sealing ring. In this embodiment, the mounting shaft has an annular groove containing a sealing ring, preferably an O-ring made of flouroelastomeric material to effectuate a reliable seal with the pipette tip. This embodiment has been found to be particularly effective for pipettors having relatively large pipette tips, such as 300μ liters or 1250μ liters. The sealing O-ring is on the mounting shaft, preferably located so that it seals against the upper end of the barrel of the pipette tip. Preferably, in order to lessen long term wear on the O-ring as well as insertion and ejection forces, the center line of the O-ring will reside no more than about 0.03 inches into the barrel of the pipette tip below the circumferential shelf on the pipette tip.

In another aspect, the invention relates to the configuration of a disposable pipette tip in which a sealing area with a sealing ring is located below a circumferential shelf that separates and isolates the sealing area from the upper mounting collar. By moving the sealing function away from the collar or shelf area into the upper area of the barrel, the design limitations for the mounting configuration of the pipette tip collar is less restrictive. For example, in the cases of the preferred embodiment of the invention, the collar is flexed and distorted out of round when mounted on the mounting shaft. Locating the sealing area on the pipette tip below the circumferential shelf to isolate the sealing area from distortion facilitates this mounting arrangement.

These and other aspects, features and advantages of the invention are now described in greater detail with reference to the accompanying drawings.

BRIEF DESCRIPTION OF THE DRAWINGS

FIG. 3 is a side elevational view of the mounting shaft and pipette tip shown in FIG. 2.

FIG. 4 is a longitudinal cross-section taken along line 4-4 in FIG. 3.

FIG. 5 is a detailed view of the area encircled by line 5-5 in FIG. 4 showing an upper locking collar, sealing area and circumferential shelf of the disposable pipette tip illustrated in FIG. 2.

FIG. 9 is a detailed view over the area encircled by line 9-9 in FIG. 8 showing insertion of the mounting shaft into the pipette tip just prior to final engagement.

FIG. 10 is a detailed view similar to FIG. 9 showing, full insertion of the mounting shaft into the pipette tip.

FIG. 11 is a view taken along line 11-11 in FIG. 10 illustrating the pipette tip collar and locking ring being distorted out of round when the pipette tip is fully mounted onto the mounting shaft.

DETAILED DESCRIPTION OF THE INVENTION

Figure 1:
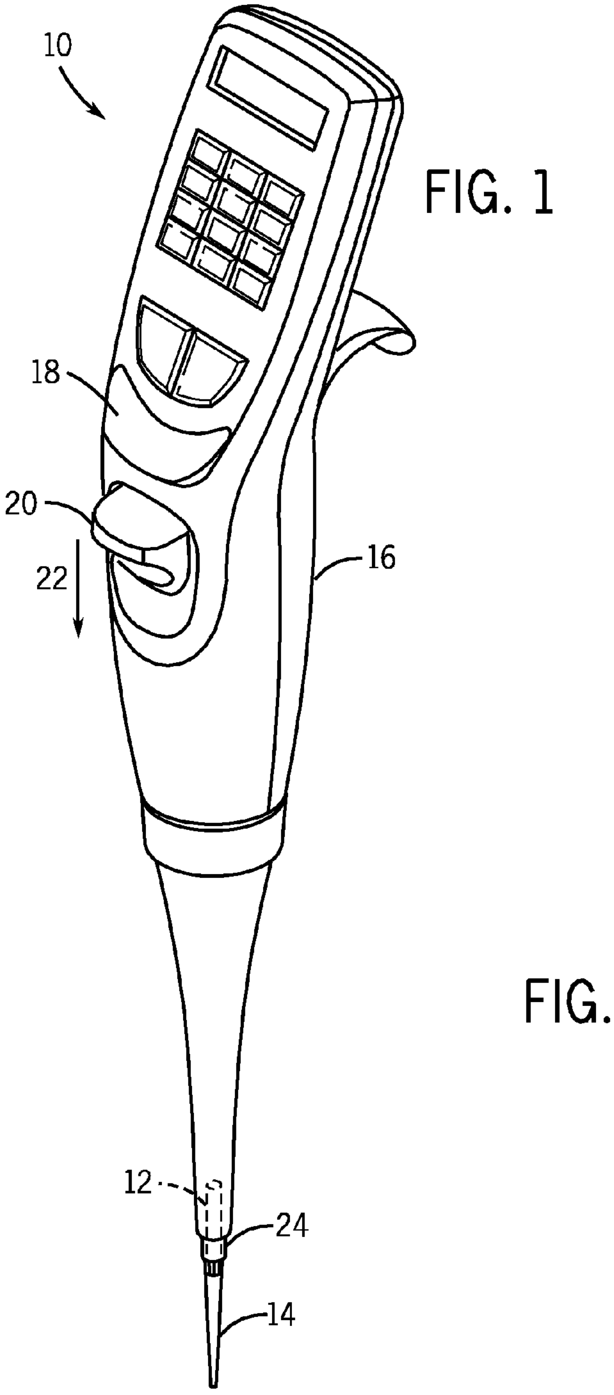
FIG. 1 is a perspective view of a hand-held, electronic air displacement pipette incorporating the concepts of the present invention.

FIG. 1 illustrates a hand-held, electronic air displacement pipette 10 that incorporates a pipette mounting shaft 12 and a disposable pipette tip 14 constructed in accordance with the preferred embodiment of invention. The pipette 10 includes a housing 16 designed to be held in the palm of the user. Internal components of the pipette (not shown) drive a piston that extends through a seal assembly to displace air within an aspiration and dispensing cylinder. The pipette mounting shaft 12 is threaded or otherwise attached to the lower end of the pipette such that it is in fluid communication with the aspiration and dispensing chamber. The attachment of the mourning shaft to the pipette is not particularly relevant to the concepts of the invention, and is well known in the art. Button 18 is provided for the user to instruct the electronic pipette to aspirate and dispense. The pipette 10 also includes a lever 20 that is actuated in the direction of arrow 22 to move an ejection mechanism sleeve 24 downward in order to eject the disposable pipette tip 14 from the mounting shaft 12.

While the invention is shown and described with respect to its use on a hand-held, electronic air displacement pipette 10, the invention is also useful in connection with other types of hand-held pipettes, as well as automated liquid handling machines using dispensable pipette tips. For example, the ergonomic features provided by the invention are particularly useful for hand-held manual pipettes as well as electronic pipettes. In addition, features of the invention that relate to the security and stability of the engagement of the pipette tip to the mounting shaft are quite useful for automated liquid handling systems as well as hand-held pipettes.

Figure 2:
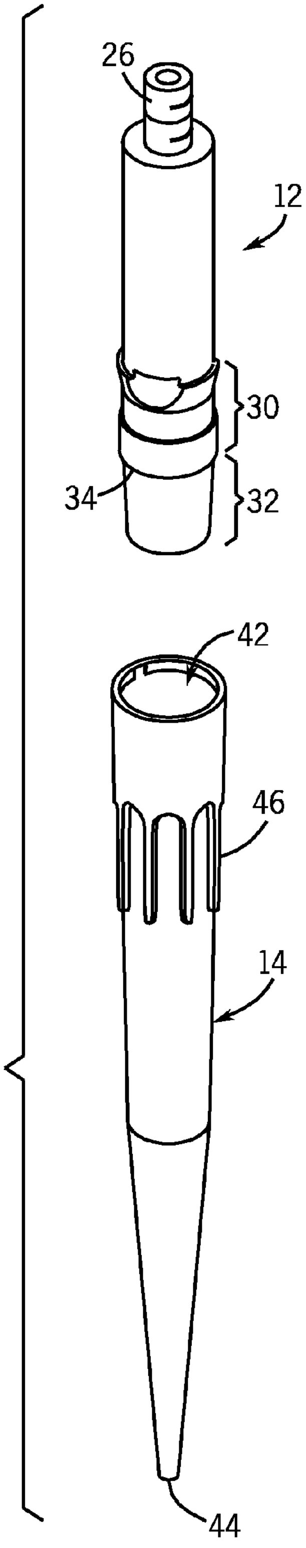
FIG. 2 is a perspective view showing a disposable pipette tip and a pipette tip mounting shaft in accordance with a preferred embodiment of the invention.

As shown in FIG. 2, the mounting shaft 12 preferably has threads 26 for attaching the mounting shaft 12 to the lower end of the aspiration and dispensing cylinder (not shown). As discussed herein, the dimensions of the mounting shaft 12 match the dimensions of the pipette tip 14 so that only pipette tips 14 with the proper dimensions can fit onto the mounting shaft 12. In order to use pipette tips with different bore dimensions in the collar and sealing region, it is necessary to replace the mounting shaft 12 and/or the tubular stripper shaft 24 with one having appropriate dimensions.

Referring now to FIGS. 2-6, the mounting shaft 12 contains a central bore 28 that provides for air passage between the aspiration and dispensing cylinder in the pipette 10 and the pipette tip 14, as is well known in the art. The mounting shaft 12 includes an upper locking section 30, a lower sealing section 32, and a stop member 34 located between the locking section 30 and the lower sealing section 32. The pipette tip 14 generally consists of a collar 36, a barrel 38 and a circumferential shelf 40 that extends around the inside bore of the tip 14 and connects the lower end of the collar 36 to the upper end of the barrel 38. The upper end of the collar 36 has an opening 42 to receive the pipette mounting shaft 12. The lower end of the barrel 38 has a small opening 44 through which liquid is aspirated into the tip barrel 38 and dispensed from the tip barrel 38 during normal operation of the pipette 10. Support ribs 46 extend downward on the outside surface of the pipette tip 14 from the collar 36. The support ribs 46 function to hold the tip 14 or an array of tips 14 in a tray or the like for subsequent use, as is known in the art.

The internal surface of the pipette tip 14 is now described in more detail, referring in particular to FIG. 5. The inside surface of the collar 36 preferably includes a circumferential locking ring 48, although aspects of the invention can be accomplished without the locking ring 48. The locking ring 48 is preferably located at or slightly below the opening 42 for the collar 36. The locking ring 48 extends inward from the inside wall of the collar 36 a slight amount, preferably in the range of 0.001 inches to 0.010 inches, in order to provide a locking fit over the lobes 50 on the mounting shaft 12. It is important, however, that the locking ring 48 not extend so far inward to interfere with efficient and effective ejection of the disposable tip 14 from the mounting shaft 12 after use. The locking ring 48 can optionally include one or more air bleeds 52. The air bleed can optionally be incorporated on the mounting shaft 12 instead of, or in addition to), the locking ring 48 of the pipette tip. The primary purpose of such air bleeds is to prevent aspiration of liquid in the case that an improperly sized pipette tip is mounted onto the mounting shaft. This is important in order to reduce the chance of contamination of the pipette cylinder, for example, when a large volume of liquid is accidentally aspirated into a tip designed for a small volume of liquid.

The inside surface of the collar 36 is preferably tapered or slightly frustoconical, but can also be cylindrical in accordance with the invention. Preferably, the taper is between 0° and 10°. In any event, horizontal cross-sections through the main section of the collar 36 are preferably circular.

The upper portion 39 of the barrel 38 is the sealing area for the pipette tip 14. A circumferential sealing ring 54 preferably extends inward from the inner surface of the upper portion 39 of the barrel 38 in the sealing area. Alternatively, sealing can be accomplished without sealing ring 54. The sealing area 39 in the barrel 38 is preferably frustoconical, but can also be substantially cylindrical, in accordance with the invention. The preferred taper is between ½° and 4°. Preferably, the sealing ring 54 extends 0.003 inches inward from the surface of the barrel 38, and its longitudinal thickness is 0.010 inches.

The circumferential shelf 40 of the pipette tip 14 connects the lower portion of the collar 36 to the upper portion 39 of the barrel 38. The shelf 40, as shown in the Figures, is angular and continuous around the inside circumference of the tip 14. The shelf 40 need not be angular, however, and can for example be horizontal. The shelf 40 serves to separate the locking region or collar 36 of the pipette tip 14 from the sealing area 39 of the pipette 14 in the upper portion of the barrel 38. As best illustrated in FIG. 11, the collar 36 is distorted out of round when the mounting shaft 12 is fully inserted into the pipette tip 14. The shelf 40 serves to isolate the sealing area in the upper portion of the barrel 38 from this distortion, thereby facilitating an effective seal of the sealing ring 54 against the sealing section 32 of the mounting shaft 12. It also serves to accurately locate the tip on the mounting shaft. With multiple channel devices, the tip shelf insures the same vertical mounting distance from tip to tip. This allows precise and consistent tip position during pipetting.

It is contemplated that pipette tips 14 manufactured in accordance with the invention will be typically made of molded plastic, normally polyethylene or polypropylene with or without various additives, as is known in the art. This design embodies a locking ring 48 and sealing ring 54 that help the injection molding process. They serve as a way to keep the molded tip on the core of the mold instead of using a puller ring for this process.

Referring now in particular to FIGS. 2, 3, 4 and 6, the sealing section 32 of the mounting shaft 12 is tapered in an amount corresponding to the sealing area 39 of the pipette tip in the upper portion of the pipette tip barrel 38. The Outer surface of the sealing section 32 of the mounting shaft 12 forms an interference fit with the sealing ring 54 on the pipette tip 14 to provide an air-tight seal in order to effectuate accurate aspiration and dispense of liquid into and from the pipette tip barrel 38. The locking section 30 of the mounting shaft preferably includes a central cylindrical stabilizing section 56, which is located immediately above and adjacent the stop member 34. When the pipette tip 14 is mounted on the mounting shaft 12, the central cylindrical stabilizing section 56 on the mounting shaft 12 helps to support the tip 14 in a stable straight orientation. One of the advantages of the invention is that the mating locking mechanism allows the tips 14 to be securely mounted in a consistently straight orientation. This allows the use of longer pipette tips 14, which can be particularly desirable in certain applications. The diameter of the mounting shaft 12 decreases at the stop member 34 between the central stabilizing section 56 and the upper portion of the sealing section 32 commensurate with the reduction in diameter of the matching pipette tip 14 at its circumferential shelf 40. As mentioned, this reduction is preferably in the range of about 0.004 to 0.040 inches. Note that it is not necessary that the cylindrical stabilizing section 56 and the stop member 34 be continuous around the circumference of the mounting shaft 12 inasmuch as the purpose of these components is to provide secure, stable locking engagement of the pipette tip 14 on the mounting shaft 12 and not to provide a seal. Above the cylindrical stabilizing section 56, the diameter of the mounting shaft 12 may or may not reduce slightly in order to provide clearance between the mounting shaft 12 and the collar 36 of the pipette tip 14. The top of the locking section 30 of the mounting shaft 12 preferably includes two or more locking lobes 50 spaced equally around the mounting shaft 12, as well as corresponding recessed areas 58 spanning between the locking lobes 50. The lobes 50 include relatively gently sloping inclined ramps 60. The preferred slope of the ramp 60 incline with respect to the vertical axis of the mounting shaft 12 is between 10° and 20°. The lobes 50 extend outward along the ramp 60 towards the top of the locking section 30 until the lobes 50 turn abruptly inward to form catch surfaces 62. The intersection between the ramp surface 60 and the catch surface 62 at the peak of each lobe 50 is preferably slightly rounded. At its peak, the lobes 50 preferably extend outward beyond the outer surface of the cylindrical stabilizing section 56, although the exact preferred dimensions will depend on the amount of taper of the collar 36 in the corresponding matching pipette tip 14 as well as the tip wall thickness.

The mounting shaft 12 is preferably made from machined steel or machined or molded from chemically resistant plastic such as PEEK or polypropylene, and the specific dimensions are selected to correspond to the dimensions of the matching pipette tip 14. For example, the distance between the stop member 34 and the catch surfaces 62 of the lobes 50 of the mounting shaft 12 is selected to correspond to the distance between the circumferential shelf 40 and the locking ring 48 on the collar 36 of the pipette tip 14.

Figure 7:
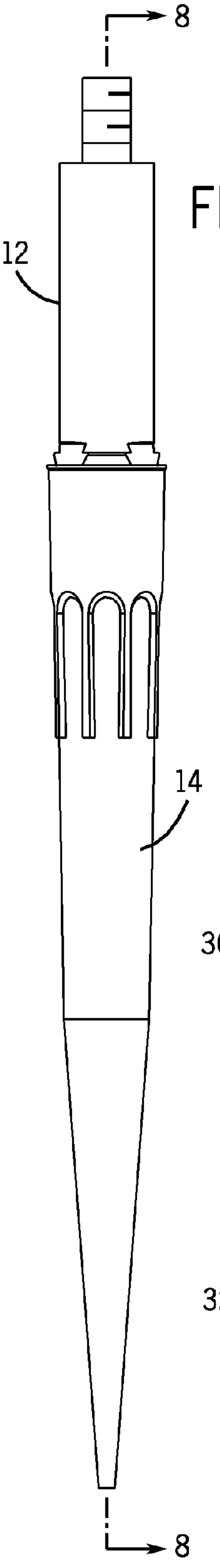
FIG. 7 is a side elevational view showing the mounting shaft being inserted into the disposable pipette tip.
Figure 6:
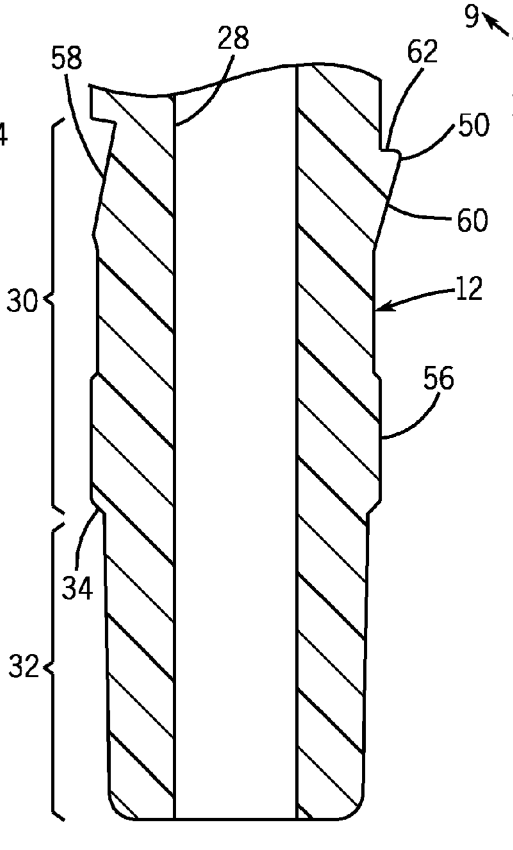
FIG. 6 is a detailed view of the area encircled by line 6-6 in FIG. 4 showing a locking section, sealing section and stop member of the mounting shaft shown in FIG. 2.
Figure 8:
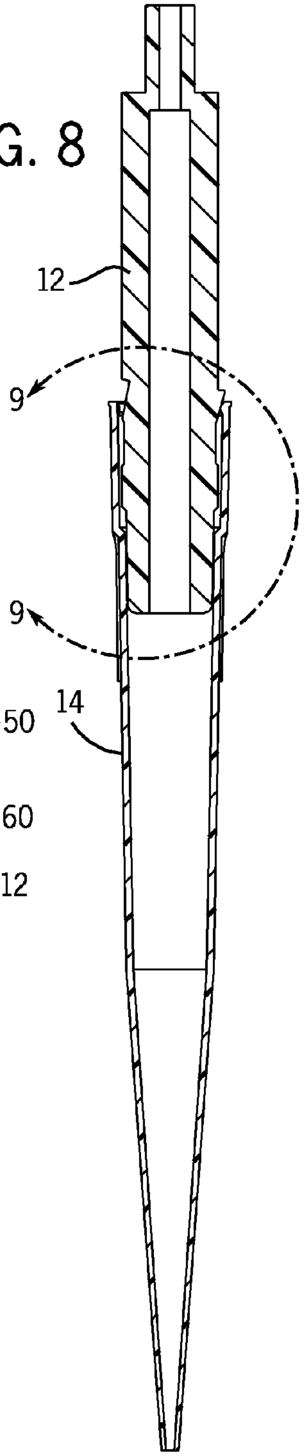
FIG. 8 is a longitudinal cross-section taken along line 8-8 in FIG. 7.

Referring now to FIGS. 7-9, as the mounting shaft 12 is pushed into the tip 14, the first point of contact is when the leading edge of the sealing section 32 on the mounting shaft 12 enters through the circumferential shelf 40 on the pipette tip 14 and contacts the sealing ring 54. As the mounting shaft 12 is further inserted into the tip 14, the sealing ring 54 interference force against the sealing section 32 of the mounting shaft 12 increases. At the same time, the ramp area 60 of the lobes 50 begins to engage the upper portion of the tip collar 36. Alternatively, as mentioned above, the initial engagement of the sealing ring 54 can be staggered with respect to the engagement of the upper portion of the tip collar 36 in order to lessen insertion force. As the mounting shall 12 is further inserted into the tip 14, the ramps 60 on the lobes 50 push against the locking ring 48 on the collar 36 of the tip 14 and gently flex the collar 36 and distort it out of round. The recessed areas 58 on the mounting shaft 12 provide ample clearance for the straightening of the collar 30 that occurs between the lobes 50. The intent is for the lobes 50 to flex the collar 36 out of round rather than stretch the collar 36.

Referring now to FIGS. 10 and 11, as the mounting shaft 12 is fully inserted into the pipette tip collar 36, the stop member 34 on the mounting shaft 12 engages the circumferential shelf 40 on the pipette tip 14, thus preventing further movement of the shaft 12 into the tip 14. At the point of engagement, the locking ring 48 on the inside surface of the tip collar 36 more or less simultaneously snaps over the lobes 50 on the mounting shaft 12. Thus, the pipette tip 14 is securely locked into place onto the mounting shaft 12 with there being a positive engagement between the stop members 34 on the mounting shaft 12 and the circumferential shelf 40 on the pipette tip 14 on the one hand, and the catch surface 62 of the lobes 50 on the mounting shaft 12 and the underside of the locking ring 48 of the tip collar 36 on the other hand. FIG. 11 shows a cross-sectional view looking down on the tip collar 36 being locked onto the mounting shaft 12 over the lobes 50. The collar 36 is flexed and distorted to an out of round condition. Note that phantom line 70 indicates the outside surface of the collar 36 opening in its preferred round state before being mounted on the mounting shaft 12. Phantom line 72 indicates the position of the inside surface of the locking ring 48 of the collar 36 in its preferred round state before being mounted over the lobes 50 on the mounting shaft 12. While the mounted collar 36 is flexed and distorted out of round, the circumferential shelf 40 below the collar 36 remains circular due to its structural integrity.

By flexing and distorting the tip collar 36 rather than stretching the collar 36 in order to mount the tip 14, the required insertion force is relatively small as compared to other designs which require tight interference fits or stretching of the tip collar. The user senses that full engagement is near as the mounting shaft 12 is inserted into the tip 14 because of the slightly increasing resistance of the interference with the sealing ring 54 on the tip and the increasing diameter of the ramp lobes 50. Definite feedback of full engagement occurs when the stop member 34 engages the circumferential shelf 40 and the locking ring 48 snaps over the lobes 50. The locking engagement is robust and reduces unintentional dismounting of the tip when a side force is applied to the tip, such as during touching-off procedures.

Figure 12:
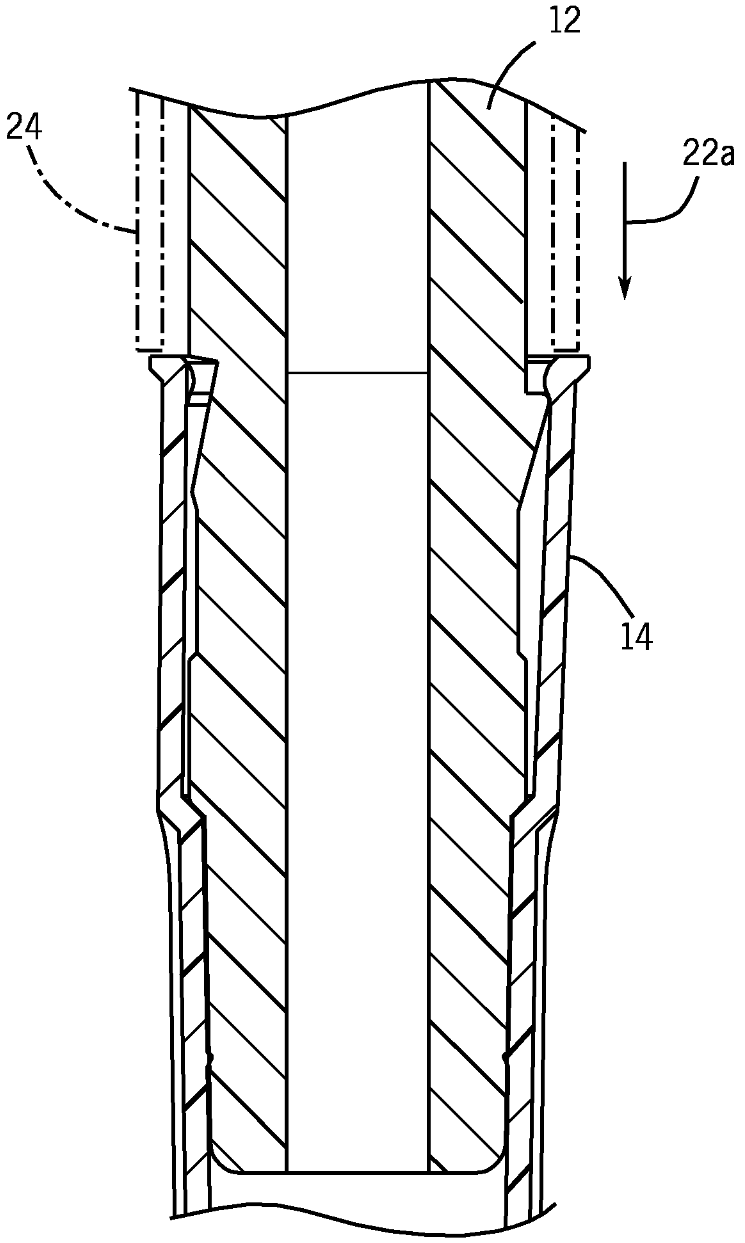
FIG. 12 is a view similar to FIG. 10 illustrating the pipette tip being stripped off the mounting shaft.

In addition, the system enables low ejection forces, which is particularly advantageous for hand-held pipettes. As mentioned, the out of round distortion of the collar 36 storing energy in the mounted collar 36 is useful for throwing off the tips 14 after use. Conventional ejection or stripping mechanisms can be used to push on the top of the collar 36 and push the locking ring 48 over the lobes 50 in order to eject the tips 14. FIG. 12 shows a stripper tube 24 moving downward (arrow 22*a*) to push on the top of the collar 36 to eject the tip 14. When the locking ring 48 clears the peaks of the lobes 50, the energy stored in the distorted collar 36 is released and facilitates efficient ejection of the tip 14 from the mounting shaft 12.

A preferred embodiment of the invention has been described in connection with the drawings, however, various aspects and features of the invention can be implemented in other forms. For example, it is not necessary that the mounting shaft 12 have more than two lobes. Moreover, as previously mentioned, while the preferred embodiment of the invention provides for low insertion and ejection forces as well as tactile feedback when the mounting shaft is inserted into the pipette tip, the invention is also quite useful in automated liquid handling systems where these attributes may not be as important.

Also, although not preferred, it may be desirable to move the sealing area on the pipette tip from below the shelf to above the shelf, and configure the mounting shaft so that it accommodates sealing above the stop, rather than below. Even though this is not a preferred design, such a design preferably, in accordance with the invention, includes a mounting shaft with locking lobes as described above. The sealing area on the tip, however, still has to be sufficiently isolated from distortion. This normally requires that the sealing area be located adjacent the shelf and relatively fax from the upper portion of the collar that becomes distorted by the mounting shaft lobes.

Figure 13:
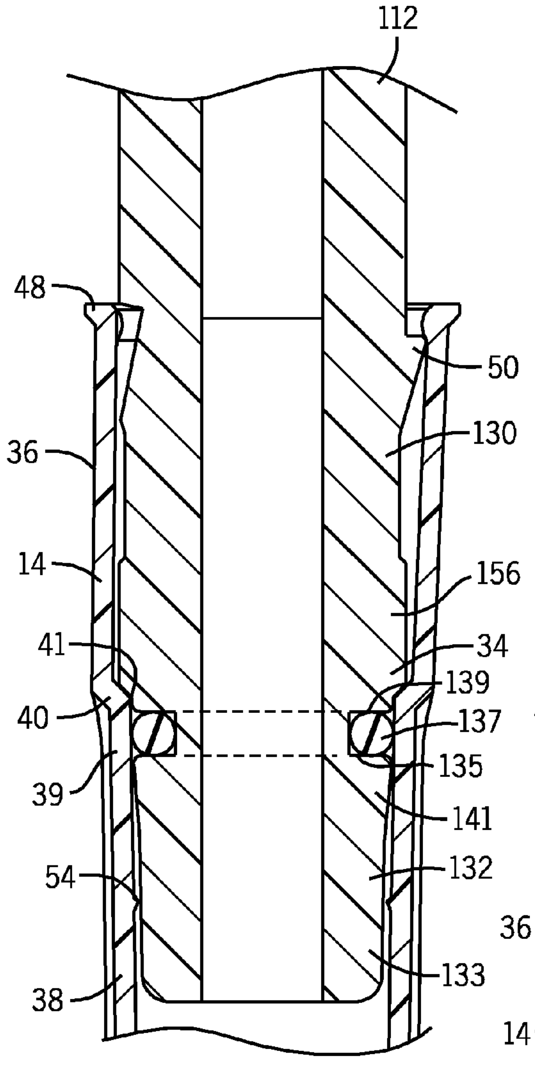
FIG. 13 is a detailed, view similar to FIG. 10 showing full insertion of a mounting shaft into the pipette tip, wherein the mounting shaft has been modified to include an annular groove and an O-ring seal in accordance with another embodiment of the invention.

Another embodiment of the invention designed to further reduce insertion and injection forces is illustrated in FIG. 13. In FIG. 13, the pipette tip 14 has the same or similar configuration to that described in the above Figures, for example FIGS. 3-5. In this regard, the same reference numbers are used in FIG. 13 as in the earlier Figures to describe the components of the pipette tip 14. For example, the pipette tip 14 shown in FIG. 13 generally consists of a collar 36, a barrel 38, and a circumferential shelf 40 that extends around the inside bore of the tip 14 and connects the lower end of the collar to the upper end 39 of the barrel 38. The pipette tip also includes a circumferential ring 54 on the inside surface of the barrel 38, which in the earlier embodiment served as a circumferential sealing ring but in this embodiment does not serve as a sealing ring because of modifications made to the mounting shaft 112. The pipette tip 14 also preferably includes a circumferential locking ring 48 along the inside surface of the collar 36 at or slightly below the opening of the collar 36, as described previously.

In FIG. 13, the mounting shaft 112 is modified so that the diameter of the lower sealing section 132 is reduced in comparison to the earlier embodiment. The configuration of the locking section 130 of the modified mounting shaft 112 is quite similar to that described in the earlier embodiments, especially with respect to the lobes 50 and the step 34 and the interaction of the lobes 50 and the step 34 with the pipette tip 14, with a caveat being that it has been found that the diameter of the central stabilizing section 156 may be reduced slightly to provide less interference between the pipette tip 14 and the mounting shaft 112 when the mounting shaft 112 is inserted into the pipette tip 14.

The lower sealing section 132 of the mounting shaft 112 in FIG. 13 is modified to reduce the diameter of the lower sealing section at the tip 133 of the mounting shaft 112 so that there is little or no interference between the circumferential ring 54 of the pipette tip 14 and the lower portion 132 of the mounting shaft 112. An annular groove 135 containing a sealing ring 137 is located at the upper end of the lower sealing section 132 of the mounting shaft 112. The sealing ring 137, as mentioned, is preferably an O-ring made of flouroelastomeric material. For a 300μ liter pipettor, the preferred O-ring has a 0.030 inches cross-section, and a 0.130 inside diameter which is stretched to a 0.147 groove diameter, which provides a 0.006 inch interference fit between the O-ring 137 and the upper portion 39 of the barrel 38 of the pipette tip 14. For a 1250μ liter pipettor, the preferred O-ring has a 0.037 inch cross-section, and a 0.172 inside diameter, which is stretched over a groove diameter of 0.189 inches again to produce an interference of about 0.006 inches between the O-ring 137 and the upper portion 39 of the barrel 38 of the pipette tip 14. Preferably, the upper edge of the groove 139 is no more than about 0.015 inches, e.g. about 0.008 inches, below the top 41 of the inside surface of the barrel 38 of the pipette tip 14. In this manner, the sealing O-ring 137 does not travel a substantial distance after it is in contact with the pipette tip 14 barrel 38. Preferably, the lower section 132 of the mounting shaft 112 includes a tapered section 141 located proximate the groove 139 above the location where the circumferential ring 54 on the pipette tip 14 would be located after the mounting shaft 112 is fully inserted into the tip 14. The tapered portion 141 tapers outward as it approaches the groove 139 in order to protect the O-ring seal 137 from damage that might otherwise be caused by contact with the pipette tip shelf 40 as the mounting shaft 112 is inserted into the pipette tip 14.

While not generally preferred, it may be desirable in some circumstances to locate the groove 137 and O-ring seal 139 within the upper locking portion 130 of the mounting shaft, so that the O-ring seal 137 engages collar 36 of the pipette tip 14.

Figure 14:
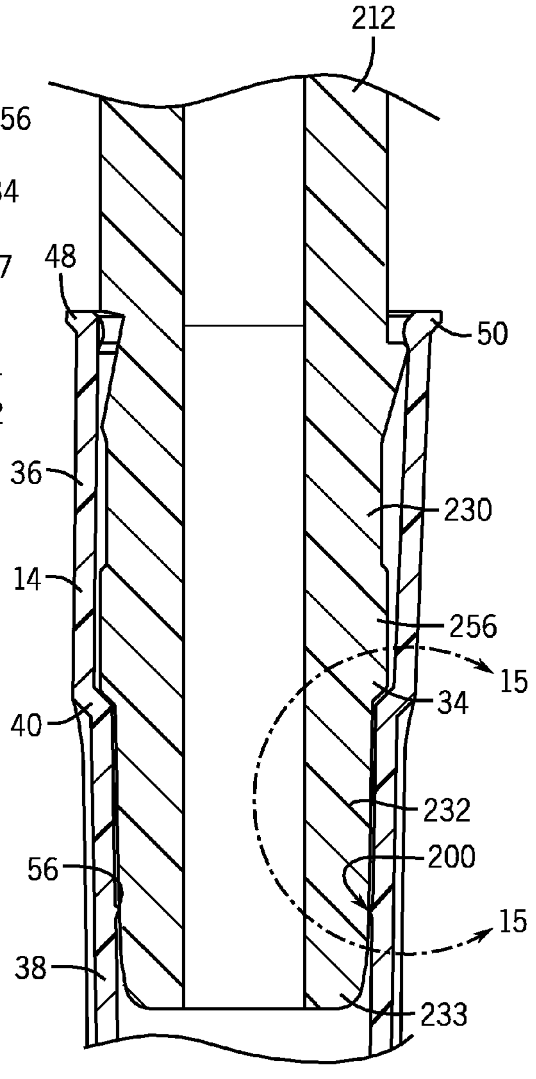
FIG. 14 is a detailed view showing the full insertion of a mounting shaft into the pipette tip, wherein the mounting shaft has been modified in accordance with another embodiment of the invention to incorporate a frustoconical sealing area which accounts for normal manufacturing tolerances.
Figure 15:
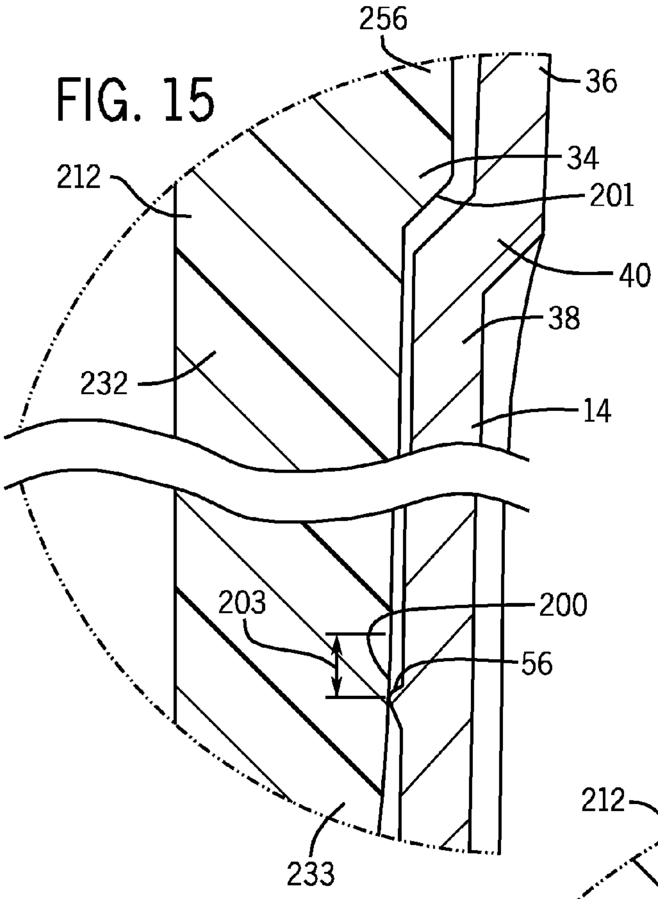
FIGS. 15 and 16 are schematic views of the area depicted by line 15-15 in FIG. 14, illustrating the interaction between the circumferential sealing ring on the pipette tip and the frustoconical sealing area on the pipette mounting shaft.
Figure 16:
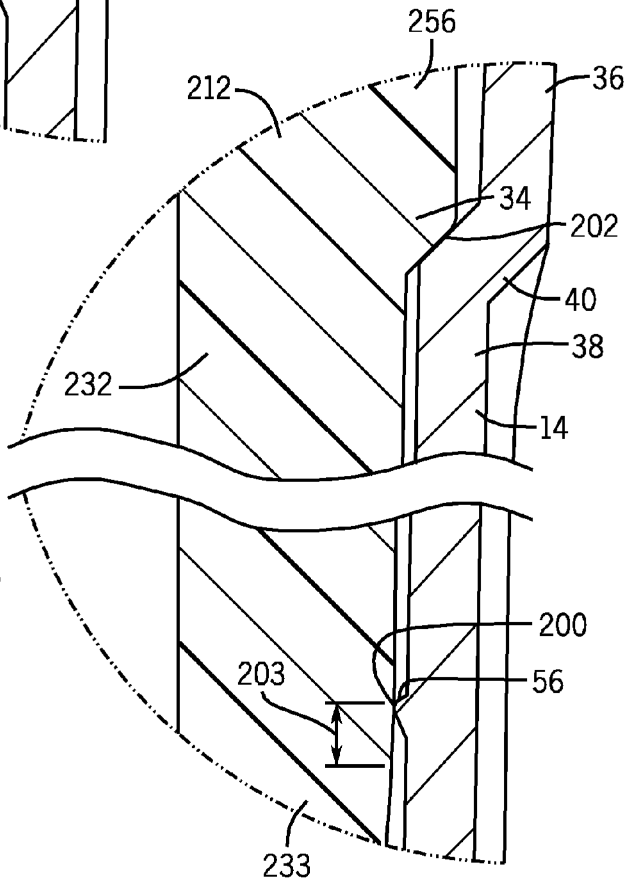

Another embodiment of the invention designed to further reduce the insertion and ejection forces is disclosed in FIGS. 14-16. The embodiment of the invention illustrated in FIGS. 14-16 is particularly useful when it is not desirable or practical to use an O-ring seal, yet it is desirable to further reduce insertion and ejection forces, such as in hand-held multichannel pipettor applications. In FIGS. 14-16, the configuration of the pipette tip mounting shaft 212 is modified, yet as with the embodiment disclosed in FIG. 13, it is preferred that the configuration of the pipette tip 14 remain similar to the earlier embodiments. For example, it has been found that the embodiment shown in FIGS. 14-16 is particularly well suited for use on multi-channel pipettors having pipette volumes of 12.5μ liter and 125μ liter. Referring to FIGS. 14-16, the lower section 232 of the mounting shaft 212 is modified to reduce the diameter of the lowermost portion 233. The diameter of the lowermost portion 233 of the mounting shaft is reduced so that there is little or no interference between the circumferential sealing ring 56 on the pipette tip 14 and the lowermost portion 233 of the mounting shaft. The lower section 232 of the mounting shaft 212 contains a frustoconical sealing area 200 located in the vicinity that the circumferential sealing ring 56 is expected to reside when the mounting shaft 212 is fully inserted into the tip 14. With respect to the upper locking portion 230 on the mounting shaft 212, it is preferred as in the embodiment shown in FIG. 13 to slightly reduce the diameter of the central stabilizing section 256 to reduce interference drag between the mounting shaft 212 and the collar 36 of the pipette tip 14.

FIGS. 15 and 16 are schematic views illustrating the operation of the frustoconical sealing area 200 on the mounting shaft 212. It should be understood that the dimensions of the frustoconical sealing area 200 are exaggerated in FIGS. 15 and 16 in order to illustrate the concept of this aspect of the invention. Referring in particular to FIGS. 15 and 16, sealing of the pipette tip 14 to the mounting shaft 212 is due to the interference between the circumferential sealing ring 56 on the pipette tip 14 and the frustoconical sealing area 200 on the mounting shaft 212. The specific dimensions of the frustoconical sealing area 200 are determined to account for normal manufacturing tolerances for molded pipette tips. In general, molded pipette tips having relatively small dimensions within normal manufacturing tolerances, will form an interference fit at the lower portion of the frustoconical section 200 as the mourning shaft 212 is inserted into the pipette tip, as shown in FIG. 15. On the other hand, molded pipette tips having a relatively large dimension, within normal manufacturing tolerances, will engage towards the upper portion of the frustoconical sealing area 200 as shown in FIG. 16. Below the frustoconical sealing area 200, it is desirable that the mounting shaft 212 does not interfere with the sealing ring 56 as the mounting shaft is inserted into the pipette tip 14. Note that in FIG. 15, there is a slight amount of clearance between the step 34 on the mounting shaft 212 and the circumferential shelf 40 between the collar 36 and the barrel 38 of the pipette tip 14. On the other hand, in FIG. 16, there is no such clearance 201 as shown in FIG. 15, but the step 34 on the mounting shaft 212 engages the circumferential shelf 40 on the barrel 38 of the pipette tip 14, as illustrated by reference number 202. For the preferred dimensions of the frustoconical sealing area 200, and the associated vertical range of travel 203 for effective sealing, it has been found that the use of a frustoconical sealing area 200 as described has little or no effect on the ability of the upper locking section 230 to lock into place within the collar 36 of the pipette tip 14.

Using quality control statistical analysis, it has been determined that the preferred range of vertical travel 203 for the frustoconical sealing area 200 be 0.025 inches for 12.5μ liter pipette tips and that the frustoconical area have an included angle of 5°; whereas, for 125μ liter pipette tips, the preferred range of vertical travel is 0.03 inches with an included taper angle of 4°. These dimensions were selected to provide a nominal interference of 0.002 inches to ensure an effective seal, and were selected so that the range would include the mean pipette tip dimension at the sealing ring 56 plus or minus three times the standard deviation.

We claim:

1. A method of using a disposable pipette tip with a pipetting system, the method comprising the steps of:

providing a disposable pipette tip comprising a barrel having a lower opening, through which liquid is aspirated into the barrel and dispensed from the barrel, an upper portion having an inside surface with a circular circumference and an upper end having a circular circumference and an inside diameter, the disposable pipette tip also comprising a collar having a continuous inner surface with a circular circumference in its relaxed state, an upper opening of the collar for receiving a tip mounting shaft on the pipetting system, and a lower end of the collar with a circular circumference in its relaxed state and an inside diameter that is larger than the inside diameter of the upper end of the barrel, and a circumferential shelf connecting the lower end of the collar to the upper end of the barrel;

providing at least one tip mounting shaft on the pipetting system, the tip mounting shaft including an internal bore through which air is displaced in order to aspirate liquid sample into and dispense liquid sample from the pipette tip, said tip mourning shaft having a lower sealing section, an upper locking section, a stop located between the upper locking section and the lower sealing section, two or more outwardly extending lobes located above the stop and spaced circumferentially around the upper locking section, and recessed relief portions spanning circumferentially between the lobes and recessed relative to the lobes;

inserting the mounting shaft into the tip collar so that the collar of the disposable pipette tip flexes and distorts outwardly as it engages the lobes cm the mounting, shaft and inwardly at the recessed relief portions on the mounting shaft between the lobes such that the collar is distorted out of round;

continuing to insert the mounting shaft into the tip collar until the mounting shaft is fully inserted into the collar such that the stop on the mounting shaft engages the circumferential shelf on the disposable pipette tip;

maintaining roundness of the circular circumference of the inside surface of the upper portion of the barrel when the mounting shaft is fully inserted into the tip collar; and sealing the inside surface of the upper portion of the barrel against the lower sealing section of the mounting shaft when the mounting shaft is fully inserted into the disposable pipette tip.

2. The method according to claim 1 further comprising the steps of:

placing the lower opening of the disposable pipette tip in a sample liquid and operating the pipetting system to provide suction through the internal bore of the mounting shaft and aspirate sample liquid into the barrel of the disposable pipette tip; and subsequently operating, to pipetting system to dispense a desired amount of the sample liquid in the barrel of the disposable pipette tip.

3. The method according to claim 1 further comprising the step of:

ejecting the disposable pipette tip by pushing on a top edge of the collar with a stripper sleeve to move the collar when it is distorted out of round relative to the mounting shaft so that the collar releases from the lobes on the mounting shaft.

4. The method according to claim 1 wherein:

each lobe on the mounting shaft includes a catch surface that is spaced longitudinally above the stop on the mounting shall by a predetermined distance;

the disposable pipette tip includes a locking ring on an inside surface of the collar spaced longitudinally above its circumferential shelf by the predetermined distance, said locking ring containing at least one void, and wherein the locking ring on the inside surface of the collar engages the catch surfaces on the respective locking lobes after the collar has been distorted outwardly at the lobes and inwardly at the recessed relief portions when the tip mounting shaft is fully inserted, into the tip collar such that the circumferential shelf of the tip engages the stop on the mounting shaft.

5. The method according to claim 1 wherein:

the inside surface of the upper portion of the barrel includes a circumferential sealing ring encircling the inside surface of the barrel and extending inward from the inside surface of the barrel; and the circumferential sealing ring seals against the lower sealing section of the mounting shaft when the mounting shaft is fully inserted into the disposable pipette tip.

6. The method according to claim 5 wherein:

wherein the tip mounting shaft further comprises a frustoconical sealing area in the lower sealing section of the shaft, said frustoconical sealing area being located below the stop on the mounting shaft, and further wherein the circumferential sealing ring seals against the frustoconical sealing area or above the frustoconical sealing area when the disposable pipette tip is fully mounted to the mounting shall.

7. The method according to claim 1 wherein:

the lower sealing section of the mounting shaft includes an annular groove and an elastomeric sealing ring in the annular groove; and the elastomeric sealing ring on the lower section of the mounting shaft seals against the upper portion of the tip barrel When the mounting shaft is fully inserted into the disposable pipette tip.

8. The method according to claim 6 wherein:

the lower section of the mounting shaft below the elastomeric sealing ring has a reduced diameter;

the inside surface of the upper portion of the barrel includes a circumferential stabilization ring encircling the inside surface of the barrel and extending inward from the inside surface of the barrel; and and wherein the method further comprises the step of stabilizing the mounted pipette tip with the circumferential sealing ring, with little or no interference between the circumferential stabilization ring and the lower section of the mounting shaft with reduced diameter.

9. A method according to claim 1 wherein the provided pipetting system includes multiple tip mounting shafts having the limitations recited in claim 1 for the at least one tip mounting shaft, and multiple disposable pipette tips having the limitations recited in claim 1 for the disposable pipette tips are provided, there being at least one disposable pipette tip for each mounting shaft; and further wherein the method steps recited in claim 1 occur substantially contemporaneously for each pair of tip mounting shaft mid disposable pipette tip.

* * * * *